(12) United States Patent
Lin et al.

(10) Patent No.: US 11,847,782 B2
(45) Date of Patent: Dec. 19, 2023

(54) DETECTING METHOD

(71) Applicant: Wistron Corporation, New Taipei (TW)

(72) Inventors: Ting-Yu Lin, New Taipei (TW); Chung-Hung Sung, New Taipei (TW)

(73) Assignee: Wistron Corporation, New Taipei (TW)

( * ) Notice: Subject to any disclaimer, the term of this patent is extended or adjusted under 35 U.S.C. 154(b) by 189 days.

(21) Appl. No.: 17/372,536

(22) Filed: Jul. 12, 2021

(65) Prior Publication Data
US 2022/0254027 A1   Aug. 11, 2022

(30) Foreign Application Priority Data

Feb. 8, 2021   (TW) .................................. 110104638

(51) Int. Cl.
| | |
|---|---|
| *H04N 17/02* | (2006.01) |
| *G06T 7/00* | (2017.01) |
| *G01N 21/77* | (2006.01) |
| *G06T 7/136* | (2017.01) |
| *H04N 17/00* | (2006.01) |
| *H04N 23/90* | (2023.01) |

(52) U.S. Cl.
CPC .......... *G06T 7/0016* (2013.01); *G01N 21/77* (2013.01); *G06T 7/136* (2017.01); *H04N 17/002* (2013.01); *H04N 23/90* (2023.01); *G06T 2207/30168* (2013.01)

(58) Field of Classification Search
CPC ................... G06T 7/0016; G06T 7/136; G06T 2207/30168; H04N 23/90; H04N 17/002; G01N 21/77

USPC ......................................................... 348/180
See application file for complete search history.

(56) References Cited

U.S. PATENT DOCUMENTS

| | | | | |
|---|---|---|---|---|
| 9,773,318 | B2* | 9/2017 | Mostafavi | ............ H04N 17/002 |
| 10,502,689 | B2* | 12/2019 | Beule | ................. G01N 21/8483 |

FOREIGN PATENT DOCUMENTS

| | | |
|---|---|---|
| TW | M467056 | 12/2013 |
| TW | 201714144 | 4/2017 |
| TW | 201732269 | 9/2017 |
| TW | 201942868 | 11/2019 |
| TW | M597871 | 7/2020 |

OTHER PUBLICATIONS

"Office Action of Taiwan Counterpart Application", dated Jan. 26, 2022, p. 1-p. 7.
"Office Action of Taiwan Counterpart Application", dated Nov. 14, 2022, p. 1-p. 8.

* cited by examiner

*Primary Examiner* — Trang U Tran
(74) *Attorney, Agent, or Firm* — JCIPRNET

(57) ABSTRACT

A detecting method adapted to detect a detecting cassette is provided. A detecting cassette is placed into a device main body to be located at a detecting region inside the device main body. At least one image of the detecting region is captured by an image capturing unit. Whether a function of the image capturing unit is normal is determined by a determining unit according to a grayscale value of the at least one image. If the function of the image capturing unit is normal, a detection result is determined by the determining unit according to a portion of the at least one image corresponding to the detecting cassette.

18 Claims, 13 Drawing Sheets

DETECTING METHOD

CROSS-REFERENCE TO RELATED APPLICATION

This application claims the priority benefit of Taiwan application serial no. 110104638, filed on Feb. 8, 2021. The entirety of the above-mentioned patent application is hereby incorporated by reference herein and made a part of this specification.

BACKGROUND

Technical Field

The disclosure relates to a detecting method, and particularly relates to a detecting method for determining whether a function of an image capturing unit is normal according to a grayscale value of an image.

Description of Related Art

Under limitations of existing flu detecting methods, a detecting device is used to take multiple shots of a detecting cassette inside the device in a detecting process of 0 to 10 minutes, and determine a detecting result by using a photographed image of a specimen reaction region of the detecting cassette. At present, most of flu detecting devices on the market are closed machines, and the detecting results determined are directly displayed on the outside of the machines with simple light signals. Therefore, during the detecting process, it is unable to connect an external screen or use an external device to allow medical staff to instantly confirm whether the photographed image is normal or not, but the detecting results are displayed by light signals. However, the existing machines may occasionally produce abnormal photographed images, and such abnormal photographed images often lead to errors in detection interpretation and results in incorrect detecting results.

SUMMARY

The disclosure is directed to a detecting method, which improves detection accuracy.

The disclosure provides a detecting method adapted to detect a detecting cassette. The detecting method includes following steps. The detecting cassette is placed into a device main body to be located at a detecting region inside the device main body. At least one image of the detecting region is captured by at least one image capturing unit. Whether a function of the at least one image capturing unit is normal is determined by a determining unit according to a grayscale value of the at least one image. If the function of the at least one image capturing unit is normal, a detecting result is determined by the determining unit according to a portion of the at least one image corresponding to the detecting cassette.

In an embodiment of the disclosure, the detecting cassette has an identification region and two reaction regions, and the step of capturing the at least one image of the detecting region by the at least one image capturing unit includes following steps. An image of the identification region and one of the reaction regions is captured by one of the image capturing units. An image of another one of the reaction regions is captured by another one of the image capturing units.

In an embodiment of the disclosure, the detecting cassette has an identification region and a reaction region, and the step of capturing the at least one image of the detecting region by the at least one image capturing unit includes following steps. An image of the identification region is captured by one of the image capturing units. An image of the reaction region is captured by another one of the image capturing units.

In an embodiment of the disclosure, the detecting method further includes following steps. A machine part grayscale value determination step is performed, and the machine part grayscale value determination step uses the determining unit to determine whether the function of the at least one image capturing unit is normal according to a machine part grayscale value of a portion of each image corresponding to a machine part of the device main body.

In an embodiment of the disclosure, the detecting method further includes following steps. If the grayscale value of the part of each image corresponding to the machine part is greater than a machine part grayscale value determination threshold, the function of the at least one image capturing unit is determined to be abnormal. In an embodiment of the disclosure, the detecting method further includes following steps. If the grayscale value of the part of each image corresponding to the machine part is less than a machine part grayscale value determination threshold, the function of the at least one image capturing unit is determined to be normal.

In an embodiment of the disclosure, the detecting method further includes following steps. A detecting cassette grayscale value determination step is performed, and the detecting cassette grayscale value determination step uses the determining unit to determine whether the function of the at least one image capturing unit is normal according to a detecting cassette grayscale value of a portion of the at least one image corresponding to the detecting cassette.

In an embodiment of the disclosure, the detecting method further includes following steps. If the grayscale value of the part of each image corresponding to the detecting cassette is less than a minimum threshold or greater than a maximum threshold, the function of the at least one image capturing unit is determined to be abnormal. In an embodiment of the disclosure, the detecting method further includes following steps. If the grayscale value of the part of each image corresponding to the detecting cassette is greater than the minimum threshold and less than the maximum threshold, the function of the at least one image capturing unit is determined to be normal.

In an embodiment of the disclosure, the at least one image includes at least two images, and the step of capturing at least one image of the detecting region by at least one image capturing unit includes performing an image capturing step, and the step of determining whether the function of the at least one image capturing unit is normal by the determining unit includes performing a grayscale value difference determination step, the image capturing step uses the at least one image capturing unit to respectively capture the at least two images at a first time point and at a second time point, and the grayscale value difference determination step uses the determining unit to determine whether the function of the at least one image capturing unit at the first time point and at the second time point is normal according to a difference between a grayscale value of a portion of one of the images corresponding to the detecting cassette and a grayscale value of a portion of another one of the images corresponding to the detecting cassette.

In an embodiment of the disclosure, the detecting method further includes following steps. If the function of the at least one image capturing unit at the first time point and at the second time point is abnormal, the image capturing step and the grayscale value difference determination step are again performed. In an embodiment of the disclosure, the detecting method includes following steps. If the function of the at least one image capturing unit at the first time point and at the second time point is normal, the detecting result is determined by the determining unit according to a portion of the at least one image of at least one of the first time point and the second time point corresponding to the detecting cassette.

In an embodiment of the disclosure, the detecting method further includes following steps. If the function of the at least one image capturing unit at the first time point and at the second time point is normal, a standard value is obtained according to grayscale values of parts of the two images corresponding to the detecting cassette. At least another image capturing step is performed, and the at least another image capturing step uses the at least one image capturing unit to capture at least another image of the detecting region at at least a third time point. At least another grayscale value difference determination step is performed, and the at least another grayscale value difference determination step uses the determining unit to determine whether the function of the at least one image capturing unit at the at least one third time point is normal according to a difference between a grayscale value of a portion of the at least another image corresponding to the detecting cassette and the standard value.

In an embodiment of the disclosure, the detecting method further includes following steps. If the function of the at least one image capturing unit at the at least one third time point is abnormal, the at least another image capturing step and the at least another grayscale value difference determination step are performed again. If the function of the at least one image capturing unit at the at least one third time point is normal, the determining unit determines the detecting result according to a portion of at least one of the images corresponding to the detecting cassette.

In an embodiment of the disclosure, the detecting method further includes following steps. If the function of the at least one image capturing unit at the first time point and at the second time point is abnormal, a simplified image capturing step and a simplified determination step are performed, where the simplified image capturing step uses the at least one image capturing unit to capture at least another image of the detecting region at a third time point, and the simplified determination step determines whether the function of the at least one image capturing unit at the third time point and a first selected one of the first time point and the second time point is normal according to a difference between a grayscale value of a portion of the image of the first selected one of the first time point and the second time point corresponding to the detecting cassette and a grayscale value of a portion of the at least one another image of the third time point corresponding to the detecting cassette.

In an embodiment of the disclosure, the detecting method further includes following steps. If the function of the at least one image capturing unit at the first time point and at the second time point is normal, the determining unit determines the detecting result according to a portion of the at least one image of at least one of the first time point and the second time point corresponding to the detecting cassette.

In an embodiment of the disclosure, the detecting method further includes following steps. If the function of the at least one image capturing unit at the third time point and the first selected one of the first time point and the second time point is abnormal, performing a more simplified determination step to use a difference between a grayscale value of the image of the non-first selected one of the first time point and the second time point, and the grayscale value of a portion of the at least one another image of the third time point, to determine whether the function of the at least one image capturing unit at the third time point and the non-first selected one of the first time point and the second time point is normal.

In an embodiment of the disclosure, the detecting method further includes following steps. If the function of the at least one image capturing unit at the third time point and the first selected one of the first time point and the second time point is abnormal, the simplified image capturing step and the simplified determination step are again performed. If the function of the at least one image capturing unit at the third time point and the first selected one of the first time point and the second time point is normal, the determining unit determines the detecting result according to a portion of at least one of the at least one image of the first selected one of the first time point and the second time point and the at least another image of the third time point corresponding to the detecting cassette.

In an embodiment of the disclosure, the detecting cassette has an identification region, and the step of determining whether the function of the at least one image capturing unit is normal includes determining whether the function of the at least one image capturing unit is normal according to a grayscale value of a portion of the at least one image corresponding to at least a portion of the identification region.

In an embodiment of the disclosure, the detecting cassette has at least one reaction region and at least one reference symbol adjacent to the at least one reaction region, and the step of determining whether the function of the at least one image capturing unit is normal includes determining whether the function of the at least one image capturing unit is normal according to a grayscale of a portion of the at least one image corresponding to the at least one reference symbol.

In an embodiment of the disclosure, the detecting method further includes following steps. A machine part grayscale value determination step is performed, where the machine part grayscale value determination step uses the determining unit to determine whether the function of the at least one image capturing unit is normal according to a grayscale value of a portion of each image corresponding to a machine part of the device main body; and a detecting cassette grayscale value determination step is performed, where the detecting cassette grayscale value determination step uses the determining unit to determine whether the function of the at least one image capturing unit is normal according to a grayscale value of a portion of the at least one image corresponding to the detecting cassette.

Based on the above description, the disclosure determines whether the function of the image capturing unit is normal according to the grayscale value of the image captured by the image capturing unit, so as to ensure that the determining unit analyses the normal image, thereby avoiding errors in the analysis results caused by the abnormal images captured by the image capturing unit. In this way, detection accuracy and detection efficiency are improved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
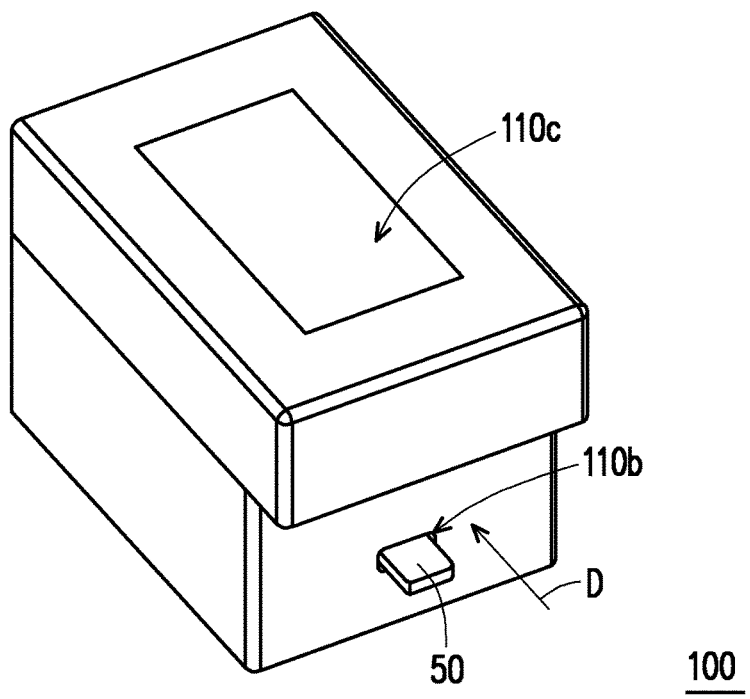
FIG. 1 is a three-dimensional view of a detecting device according to an embodiment of the disclosure.
Figure 2:
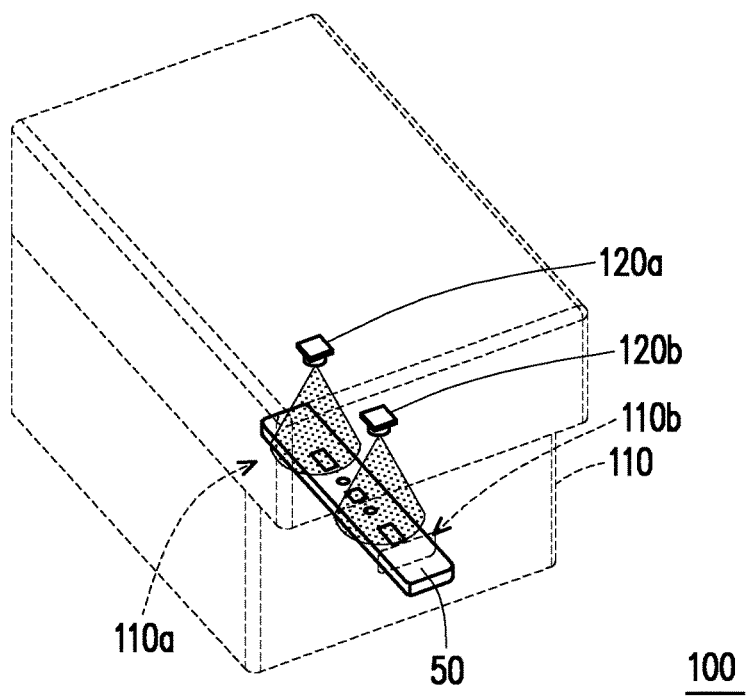
FIG. 2 is a schematic perspective view of the detecting device of FIG. 1.
Figure 3:
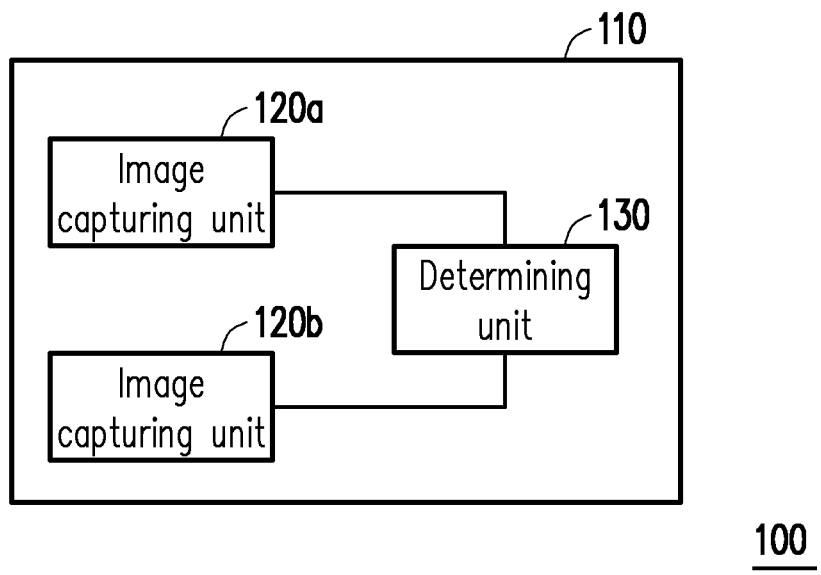
FIG. 3 is a schematic block diagram of the detecting device of FIG. 1.

FIG. 1 is a three-dimensional view of a detecting device according to an embodiment of the disclosure. FIG. 2 is a schematic perspective view of the detecting device of FIG. 1. FIG. 3 is a schematic block diagram of the detecting device of FIG. 1. Referring to FIG. 1 to FIG. 3, the detecting device 100 of the embodiment is, for example, a nucleic acid detecting device or other types of biological specimen detecting devices, and is suitable for detecting a detecting cassette 50 carrying a biological specimen. The detecting device 100 includes a device main body 110, at least one image capturing unit (two image capturing units 120a, 120b are illustrated), and a determining unit 130. The device main body 110 has a detecting region 110a inside, i.e., a region used for accommodating the detecting cassette 50 in the device main body 110. The image capturing units 120a and 120b and the determining unit 130 are disposed in the device main body 110. The image capturing units 120a, 120b are, for example, cameras and are sequentially arranged along an insertion direction D, and the determining unit 130 is, for example, a control circuit board and is coupled to and controls the image capturing units 120a, 120b. When the detecting cassette 50 is inserted into the device main body 110 through an opening 110b of the device main body 110 along the insertion direction D as shown in FIG. 1 and FIG. 2, a detecting process will be started.

Figure 4:
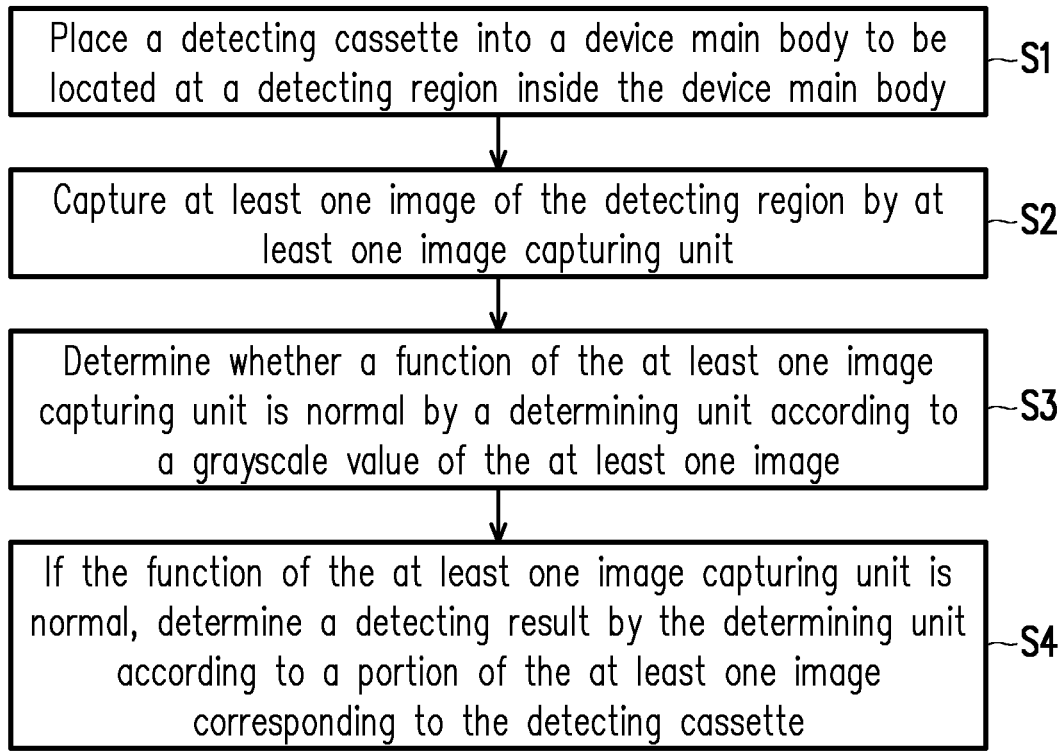
FIG. 4 is a flowchart of a detecting method according to an embodiment of the disclosure.

FIG. 4 is a flowchart of a detecting method according to an embodiment of the disclosure, which may be applied to the detecting device 100 shown in FIG. 1 to FIG. 3. Referring to FIG. 4, a user may first insert the detecting cassette 50 into the device main body 110 to be located in the detecting region 110a inside the device main body 110 (step S1). Then, the detecting device 100 automatically captures images of the detecting region 110a through the image capturing units 120a and 120b (step S2). The detecting device 100 automatically determines whether functions of the image capturing units 120a, 120b are normal according to grayscale values of the images by using the determining unit 130 (step S3). If the functions of the image capturing units 120a and 120b are normal, the detection device 100 automatically determines a detecting result by using the determining unit 130 according to a portion of image/images corresponding to the detection cassette 50 (step S4). Although the detecting cassette 50 is inserted into the device main body 110 in step S1 of the aforementioned FIG. 4, in other embodiments of the disclosure, the detecting cassette 50 may be placed into the device main body 110 in other ways instead of the way of insertion, which is not limited by the disclosure.

As described above, in the embodiment, it is determined whether the functions of the image capturing units 120a, 120b are normal according to the grayscale values of the images captured by the image capturing units 120a, 120b, so as to ensure that the determining unit 130 analyzes normal images, thereby avoiding errors in the analysis results caused by abnormal images captured by the image capturing units 120a, 120b. In this way, detection accuracy and detection efficiency are improved.

Referring to FIG. 1, the device main body 110 of the embodiment may include a display interface 110c (such as an LCD display) for displaying a detecting result of the images and/or a determination result of the images obtained by the determining unit 130. In other embodiments, the detecting device 100 may display the detecting result and/or the determination result of the images in other ways, which is not limited by the disclosure.

Figure 5A:
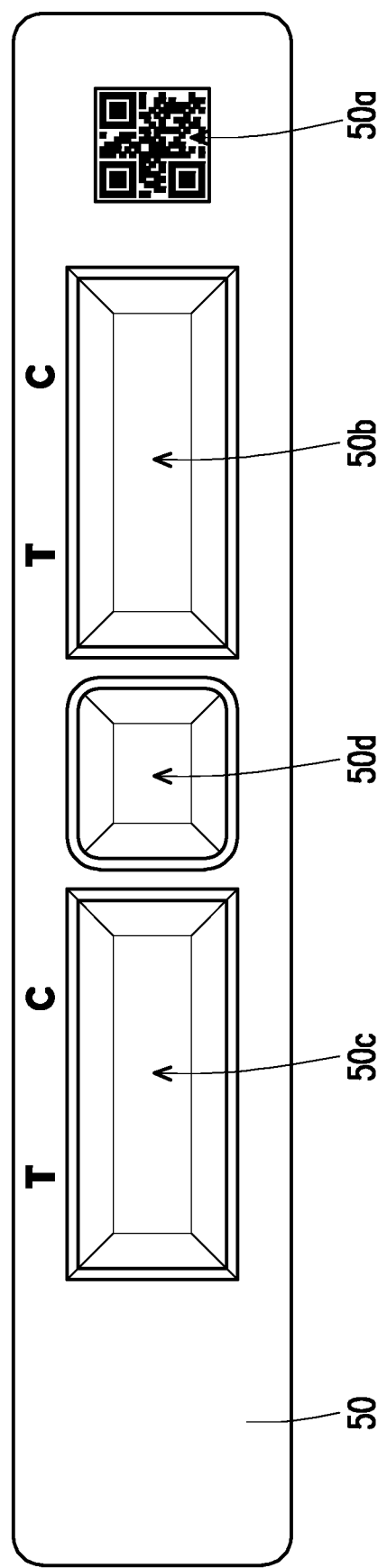
FIG. 5A is a top view of a detecting cassette of FIG. 1.
Figure 5B:
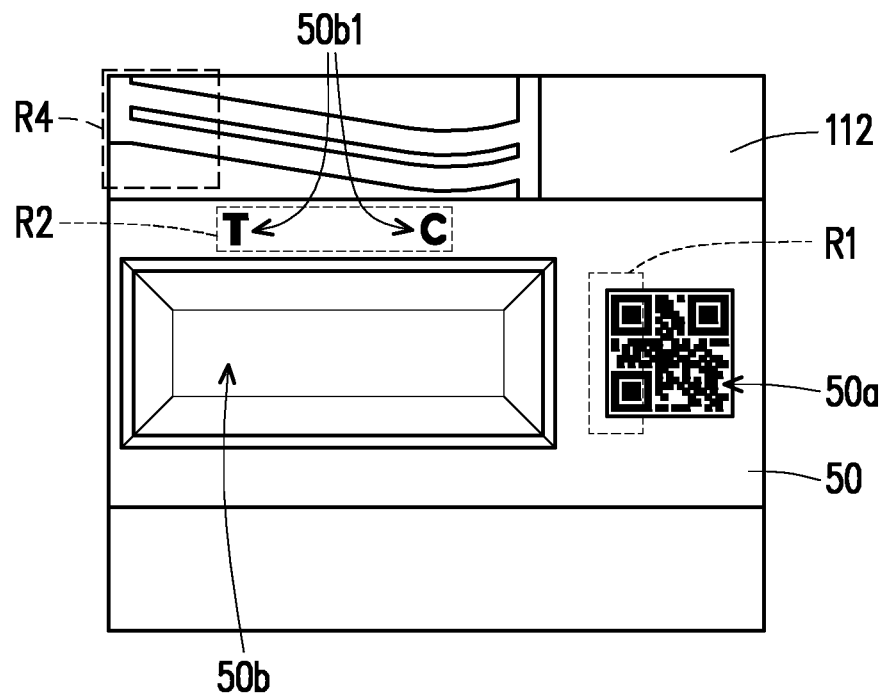
FIG. 5B and FIG. 5C respectively illustrate images captured from a detecting region by image capturing units.
Figure 5C:
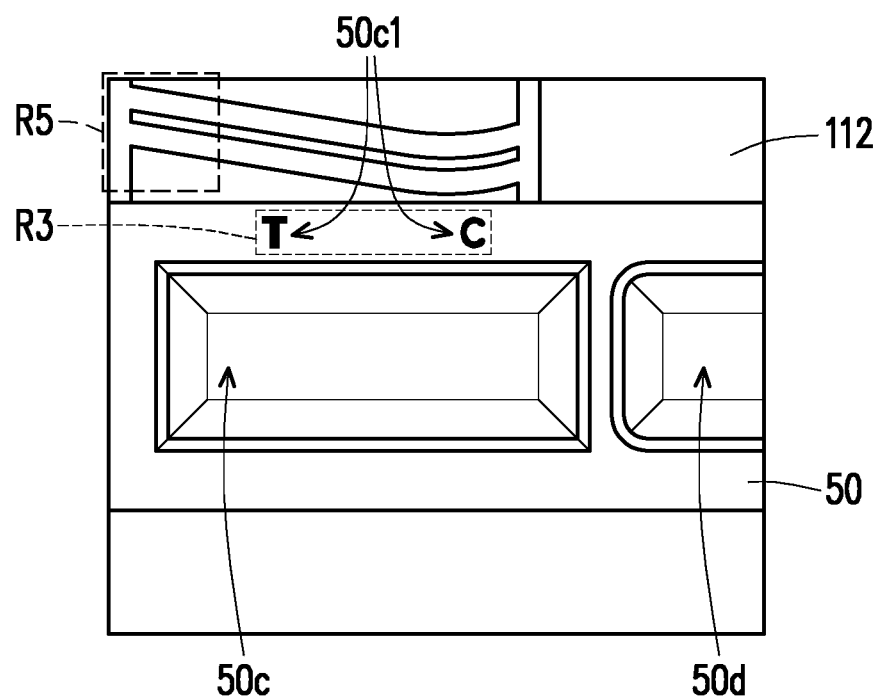
Figure 5D:
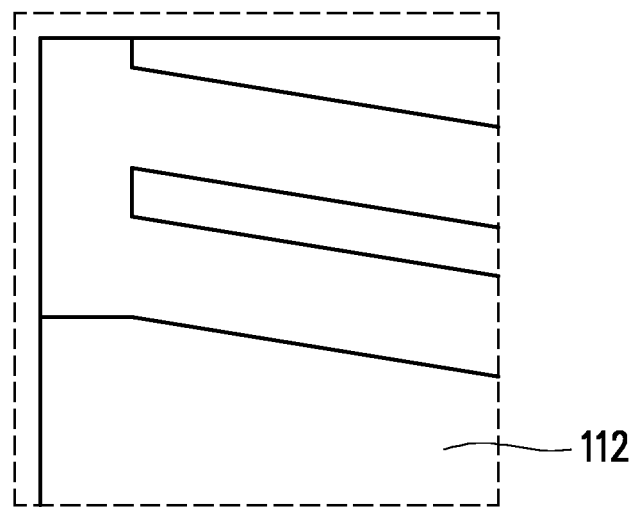
FIG. 5D and FIG. 5E respectively illustrate a partial view of the images of FIG. 5B and FIG. 5C.
Figure 5E:
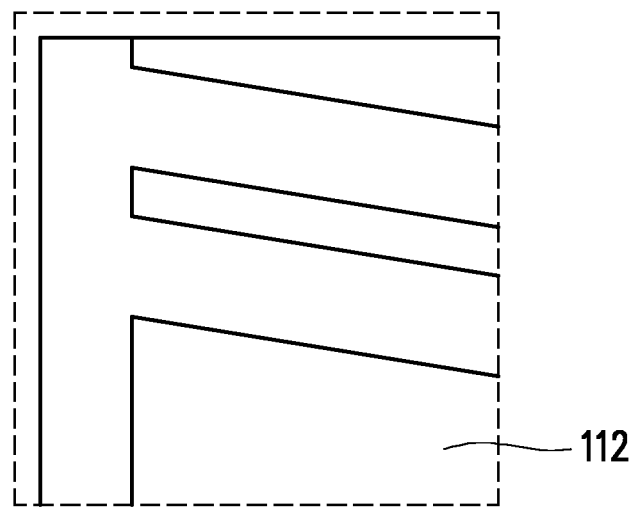

FIG. 5A is a top view of the detecting cassette of FIG. 1. FIG. 5B and FIG. 5C respectively illustrate images captured from the detecting region by the image capturing units. FIG. 5D and FIG. 5E respectively illustrate a partial view of the images of FIG. 5B and FIG. 5C, where FIG. 5D corresponds to a region R4 of FIG. 5B, and FIG. 5E corresponds to a region R5 of FIG. 5C. In detail, as shown in FIG. 5A, the detecting cassette 50 of the embodiment has an identification region 50a, two reaction regions 50b, 50c, and a specimen placement region 50d. The identification region 50a has a QR code or other types of graphic code, which include type information of the detecting cassette 50 to, for example, distinguish detection of different types of biological specimens (such as influenza virus or other types of viruses). A field of view of the image capturing unit 120a covers the identification region 50a and the reaction region 50b as shown in FIG. 5B, and a field of view of the image capturing unit 120b covers the reaction region 50c as shown in FIG. 5C. After a specimen is dripped into the specimen placement region 50d, the specimen flows to the left and right sides to enter the reaction regions 50b and 50c. After the specimen is left in the reaction regions 50b and 50c for a period of time, a positive or negative pattern is presented in the reaction regions 50b and 50c to represent a detecting result for the image capturing units 120a and 120b to capture.

Figure 6A:
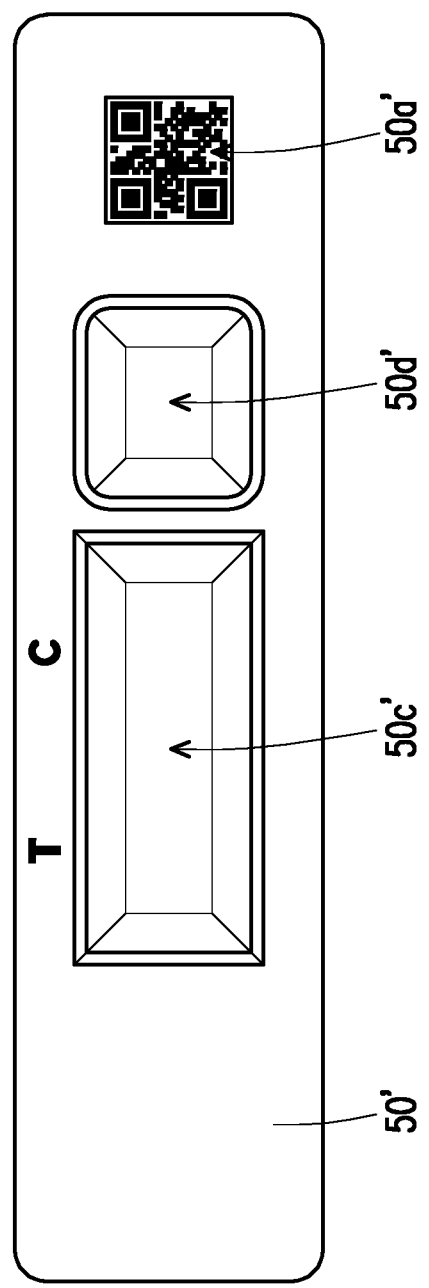
FIG. 6A is a top view of another detecting cassette.
Figure 6B:
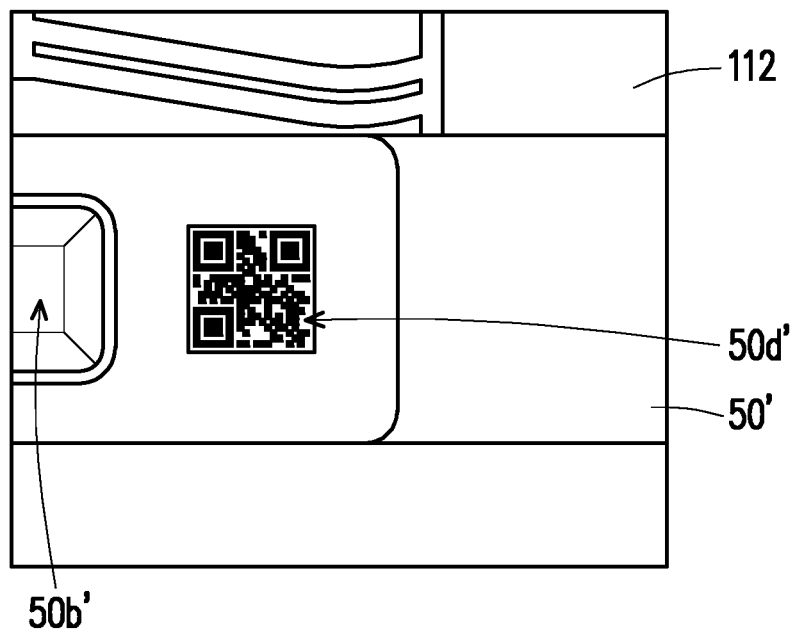
FIG. 6B and FIG. 6C respectively illustrate images captured from a detecting region by image capturing units.
Figure 6C:
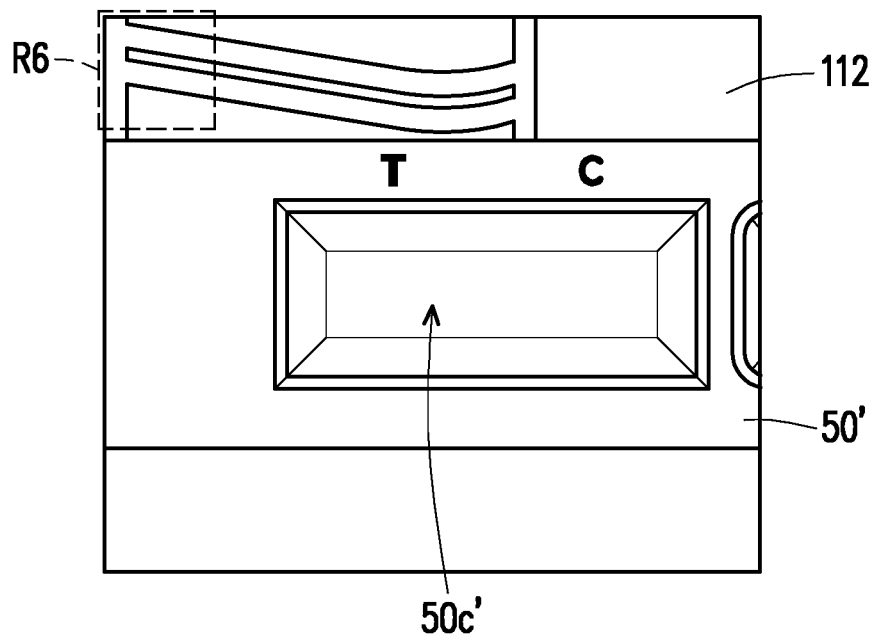
Figure 6D:
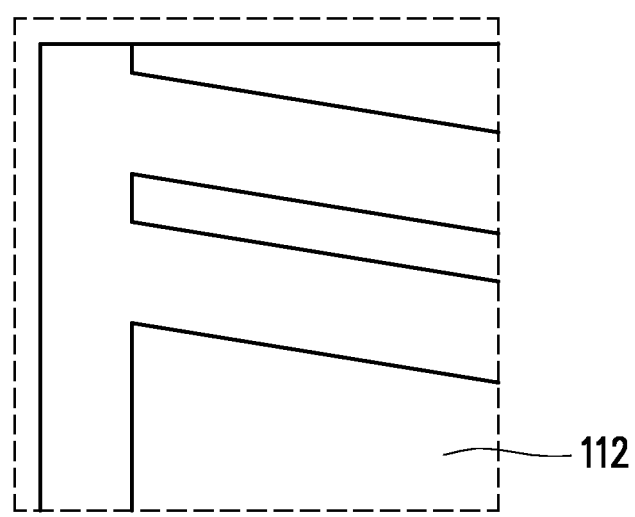
FIG. 6D illustrates a partial view of the image of FIG. 6C.

FIG. 6A is a top view of another detecting cassette. FIG. 6B and FIG. 6C respectively illustrate images captured from the detecting region by the image capturing units. FIG. 6D illustrates a partial view of the image of FIG. 6C, where FIG. 6D corresponds to a region R6 of FIG. 6C. The detecting cassette 50 of a long cassette form shown in FIG. 5A may be replaced with a detecting cassette 50' of a short cassette form shown in FIG. 6A. As shown in FIG. 6A, the detecting cassette 50' has an identification region 50a', a reaction region 50c', and a specimen placement region 50d'. The identification region 50a' has a QR code or other types of graphic codes, which include type information of the detecting cassette 50', and is used to, for example, distinguish detection of different types of biological specimens (such as influenza viruses or other types of viruses). A field of view of the image capturing unit 120a covers the identification region 50a' as shown in FIG. 6B, and a field of view of the image capturing unit 120b covers the reaction region 50c' as shown in FIG. 6C. After the specimen is dripped into the specimen placement region 50d', the specimen may flow to the left to enter the reaction region 50c'. After the specimen is left in the reaction zone 50c' for a period of time, a positive or negative pattern is presented in the reaction region 50c' to represent a detecting result for the image capturing unit 120b to capture.

Regarding the detecting cassette 50 shown in FIG. 5A, in the above step S2, the image capturing unit 120a captures the image of the identification region 50a and the reaction region 50b, and the image capturing unit 120b captures the image of the reaction region 50c. Regarding the detection cassette 50' shown in FIG. 6A, in the above step S2, the image capturing unit 120a captures the image of the identification region 50a', and the image capturing unit 120b captures the image of the reaction region 50c'. According to an embodiment of the disclosure, in the device main body 110, it is dark before the image capturing units 120a, 120b perform image capturing operations, and only when the image capturing units 120a, 120b perform image capturing operations, light is provided by flashlight or other lighting lights.

Figure 7:
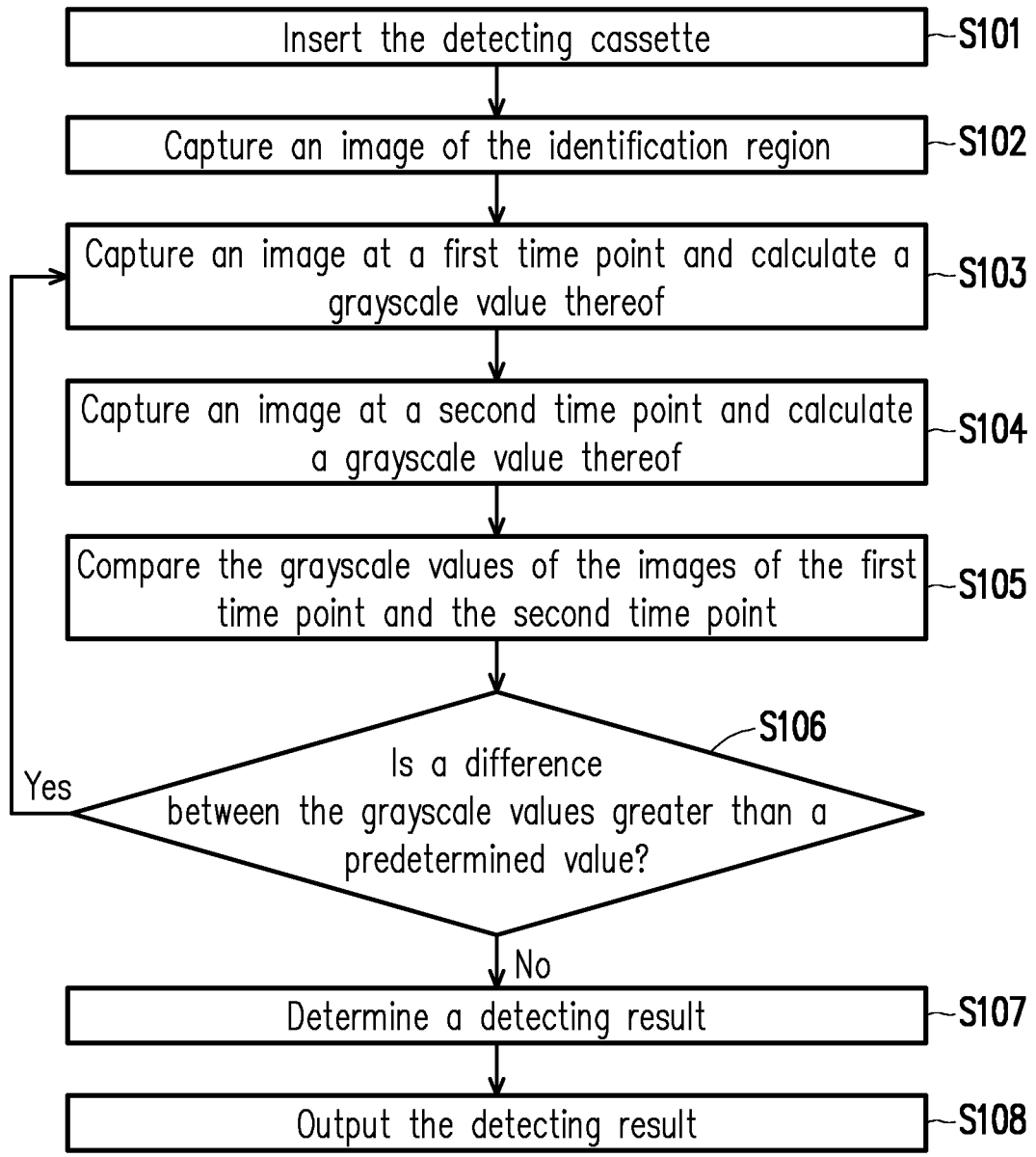
FIG. 7 illustrates a specific flow of a detecting method according to an embodiment of the disclosure.

FIG. 7 illustrates a specific flow of a detecting method according to an embodiment of the disclosure, which is a specific description for detection steps on image capturing of the detecting cassette 50 performed by the image capturing unit 120a, and detailed steps of image capturing performed by the image capturing unit 120b on the detecting cassette 50, image capturing performed by the image capturing unit 120a on the detecting cassette 50', and image capturing performed by the image capturing unit 120b on the detecting cassette 50' are the same or similar, which will not be repeated herein for the sake of brevity. Referring to FIG. 7, the user may first insert the detecting cassette 50 (step S101, corresponding to step S1 shown in FIG. 4). Then, an image of the identification region 50a is captured (step S102). An image capturing step is performed, where the image capturing unit 120a respectively captures two images at a first time point T1 and at a second time point T2 and grayscale values thereof are calculated (steps S103, S104, corresponding to step S2 of FIG. 4). A time difference T2-T1 between the first time point T1 and the second time point T2 may be 1 second according to an embodiment of the disclosure, may be 0.5 seconds according to another embodiment of the disclosure, and, may be 2 seconds according to still another embodiment of the disclosure, and may be set to other values depending on actual needs according to other embodiments, for example, the time difference may be set according to characteristics of the image capturing units 120a and 120b. A grayscale value difference determination step is performed, where the determining unit 130 determines whether the function of the image capturing unit 120a at the first time point and at the second time point is normal according to a difference between a grayscale value of a portion of one image corresponding to the detecting cassette 50 and a grayscale value of a portion of another image corresponding to the detecting cassette 50 (steps S105, S106, corresponding to step S3 shown in FIG. 4). If the difference is greater than a predetermined value, it represents that the function of the image capturing unit 120a at one of the first time point and the second time point is abnormal. Under such a situation, the flow returns to step S103 to again execute the image capturing step (steps S103, S104) and the aforementioned grayscale value difference determination step (steps S105, S106). If the difference is not greater than the predetermined value, it represents that the function of the image capturing unit 120a at the first time point and at the second time point is normal. Then, the determining unit 130 determines a detecting result according to a portion of the image of at least one of the first time point and the second time point corresponding to the detecting cassette 50 (step S107, corresponding to step S4 shown in FIG. 4) and outputs the detecting result (step S108).

In the above step S105, the grayscale value calculation may be performed on a region in the detecting region 110a that does not have a large change in grayscale value along with time. For example, it may be determined whether the function of the image capturing unit 120a is normal according to a difference between grayscale values of respective portions of the two captured images corresponding to the identification region 50a (such as a region R1 shown in FIG. 5B), and/or determined whether the function of the image capturing unit 120a is normal according to a difference between grayscale values of respective portions of the two captured images corresponding to a reference symbol 50b1 adjacent to the reaction region 50b (such as a region R2 shown in FIG. 5B). In addition, regarding the image capturing of the image capturing unit 120b on the detecting cassette 50, it may be determined whether the function of the image capturing unit 120b is normal according to a difference between grayscale values of respective portions of the two captured images corresponding to a reference symbol 50c1 adjacent to the reaction region 50c (such as a region R3 shown in FIG. 5C). The image capturing operations performed by the image capturing units 120a and 120b on the detecting cassette 50' are the same or similar, which will not be repeated one by one herein for the sake of brevity. Regarding the aforementioned method of determining whether the function of the image capturing unit 120a is normal according to the difference between the grayscale values of the respective portions of the images of the time points T1 and T2 corresponding to the region in the detecting region 110a of the detecting cassette 50 that does not have a large change in grayscale value along with time, a main reason thereof is that generally speaking, the function of the image capturing unit 120a is normal, and a result of each image capturing of a specific unchanging object in a specific unchanging environment should be the same with only minor variation, so that the difference between the grayscale values of the images at different time points T1 and T2 should not be much and thus should be less than the predetermined value. Therefore, when the difference between the grayscale values of the two images exceeds the predetermined value, the function of the image capturing unit 120a may be determined to be abnormal. However, since the probability of abnormalities in the captured images resulting from the function abnormalities of the image capturing unit 120a is not high, the probability that two consecutive captured images are both abnormal while the grayscale values of the two captured images still have only a minor variation and thus are determined to be normal is very low. Therefore, in the disclosure, to determine whether the function of the image capturing unit 120a is normal according to the difference between the grayscale values may greatly reduce the subsequent detecting result misjudgement caused by function abnormality of the image capturing unit 120a.

Compared with the aforementioned detecting mode, in another detecting mode, multiple image capturing operations are performed continuously at intervals of fixed second (s) until a predetermined total time length is reached while the detecting result is still not determined or the detecting result is determined, the detection is regarded to be completed. The flow of such detecting mode is described in detail below. According to various embodiments of the disclosure, the total time length may be about 10 minutes, about 7 minutes, about 15 minutes, etc., depending on different characteristics of the detection, such as different detection types, different detection reagents, etc.

Figure 8:
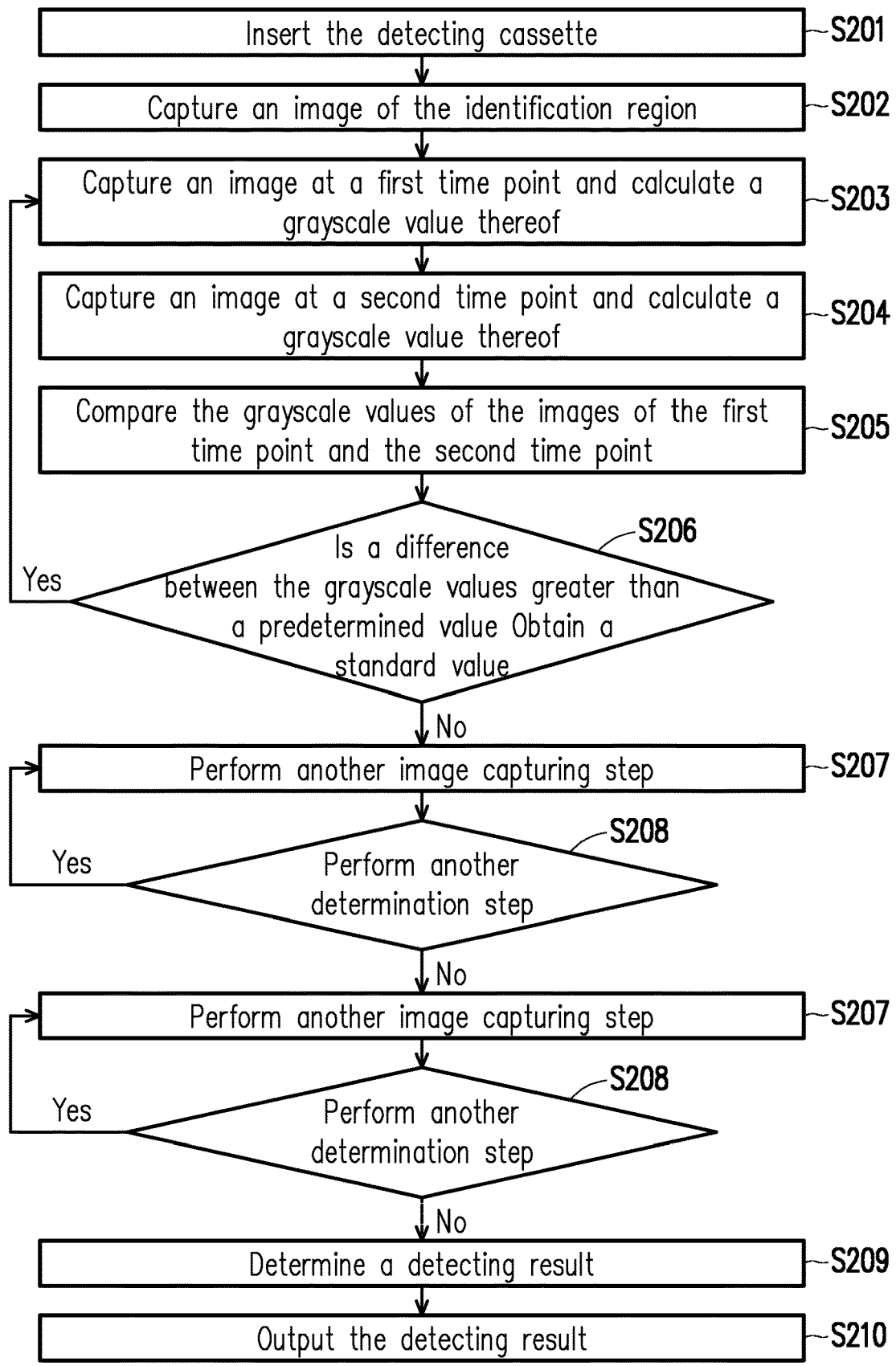
FIG. 8 illustrates a specific flow of a detecting method according to an embodiment of the disclosure.

FIG. 8 illustrates a specific flow of a detecting method according to an embodiment of the disclosure, which is a specific description for detection steps on image capturing of the detecting cassette 50 performed by the image capturing unit 120a, and detailed steps of image capturing performed by the image capturing unit 120b on the detecting cassette 50, image capturing performed by the image capturing unit 120a on the detecting cassette 50', and image capturing performed by the image capturing unit 120b on the detecting cassette 50' are the same or similar, which will not repeated herein for the sake of brevity. Referring to FIG. 8, the user may first insert the detecting cassette 50 (step S201, corresponding to step S1 shown in FIG. 4). Then, an image of the identification region 50a is captured (step S202). An image capturing step is performed, where the image capturing unit 120a respectively captures two images at a first time point and at a second time point and grayscale values thereof are calculated (steps S203, S204, corresponding to step S2 of FIG. 4). A grayscale value difference determination step is performed, where the determining unit 130 determines whether the function of the image capturing unit 120a at the first time point and at the second time point is normal according to a difference between a grayscale value of a portion of one image corresponding to the detecting cassette 50 and a grayscale value of a portion of another image corresponding to the detecting cassette 50 (steps S205, S206, corresponding to step S3 shown in FIG. 4). If the grayscale value difference is greater than a predetermined value, it represents that the function of the image capturing unit 120a at at least one of the first time point and the second time point is abnormal. Under such a situation, the flow returns to step S203 to again execute the aforementioned image capturing step and the aforementioned grayscale value difference determination step. If the grayscale value difference is not greater than the predetermined value, it represents that the function of the image capturing unit 120a at the first time point and at the second time point is normal. Then, in step S206, a standard value is obtained according to the grayscale values of the portions of the two images corresponding to the detecting cassette, and the standard value may be the grayscale value of the image at the first time point, the grayscale value of the image at the second time point, or an average value thereof. Next, at least another image capturing step (step S207, corresponding to step S2 in FIG. 4) is performed after a predetermined time length TP, where the image capturing unit 120a captures another image of the detecting region 110a at a third time point T3, and calculates a grayscale value thereof. Another grayscale value difference determination step (step S208, corresponding to step S3 in FIG. 4) is performed, where the determining unit 130 determines whether the function of the image capturing unit 120a at the third time point is normal according to a difference between the grayscale value of the portion of the another image corresponding to the detecting cassette 50 and the standard value. If the grayscale value difference is greater than the predetermined value, it represents that the function of the image capturing unit 120a at the third time point is abnormal. Under such a situation, the flow returns to step S207 to again perform the aforementioned another image capturing step and the aforementioned another grayscale value difference determination step at another time point (for example, at a time point T4). If the grayscale value difference is not greater than the predetermined value, it represents that the function of the image capturing unit 120a at the third time point is normal. The another image capturing step (S207) and the another grayscale value difference determination step (S208) are, for example, continuously performed by multiple times at intervals of the fixed predetermined time length TP. According to the various embodiments of the disclosure, the predetermined time length TP may be about 1 minute, about 2 minutes, about 0.5 minutes, etc., depending on different characteristics of the detection, such as different detection types, different detection reagents, etc. Finally, in the case that the grayscale value difference is not greater than the predetermined value, the determining unit 130 determines a detecting result according to a portion of the aforementioned captured image corresponding to the detecting cassette 50 (step S209, corresponding to step S4 shown in FIG. 4) and outputs the detecting result (step S210).

In the above step S205 and other similar image comparison steps, the grayscale value calculation may be performed on a region in the detecting region 110a that does not have a large change in grayscale value along with time. Since this part has been explained in step S105 with reference of the region R1 shown in FIG. 5B, the region R2 shown in FIG. 5B, and the region R3 shown in FIG. 5C, details thereof will be not repeated herein for the sake of brevity.

The calculation of the grayscale value performed by the determining unit 130 is, for example, grayscale value GV=(0.3×GVred)+(0.59×GVgreen)+(0.11×GVblue), where GVred, GVgreen, GVblue are respectively a red value, a green value, and a blue value of the image, and ranges of GVred, GVgreen, GVblue, and the grayscale value GV are all 0x00-0xFF. According to another embodiment of the disclosure, the calculation of the grayscale value performed by the determining unit 130 may be, GV=(NR×GVred)+(NG×GVgreen)+(NB×GVblue), where NR, NG, and NB are respectively a red value percentage, a green value percentage, a blue value percentage, and NR+NG+NB=100%. In addition to performing the grayscale value comparison on the images captured at different time points as described above, a detecting cassette grayscale value determination step may be further performed on the grayscale value of a single image itself. For example, in the regions R1, R2 shown in FIG. 5B and the region R3 shown in FIG. 5C, if the grayscale value is less than a certain minimum threshold such as 0x0F, the image is determined to be too dark, and if the grayscale value is greater than a certain maximum threshold such as 0xF5, the image is determined to be too bright. Too dark or too bright images represent that the function of the image capturing device is abnormal; otherwise, it represents that the function of the image capturing device is normal. According to another embodiment of the disclosure, the grayscale value minimum threshold may also be other values such as 0x08, 0x10, 0x1F, or other values, which may be adjusted according to actual situations. According to still another embodiment of the disclosure, the grayscale value maximum threshold may also be other values such as 0xF0, 0xE9, 0xE5, or other values, which may be adjusted according to actual situations. The detecting cassette grayscale value determination step may further improve the effectiveness of the disclosure in reducing misjudgement of the subsequent detecting result caused by the abnormal function of the image capturing unit 120*a*, which is described below. When the two captured images are both too dark, the subsequent detection cannot be performed normally since the two images are completely dark (the grayscale values are very low). However, the difference between grayscale values could be determined by the grayscale value difference determination step to be less than the predetermined value, which would cause a misjudgement that the function of the image capturing unit 120*a* is normal, and if such situation is not ruled out, it may lead to misjudgement of the detecting result. Similarly, when the two captured images are both too bright, since the two images are all bright white (the grayscale values are very high), the subsequent detection cannot be performed normally. However, the difference between grayscale values could be determined by the grayscale value difference determination step to be less than the predetermined value, which would cause a misjudgement that the function of the image capturing unit 120*a* is normal, and if such situation is not ruled out, it may lead to misjudgement of the detecting result. Consequently, introduction of the detecting cassette grayscale value determination step may rule out such situation.

In addition, in order to avoid the situation that the images of the two time points used for image comparison in the above detecting process are all abnormal so that it is unable to obtain a comparison result as a useful reference, a preliminary determination of whether the grayscale values of each image are normal may be performed in advance, which is described in detail below. The field of views of the image capturing units 120*a* and 120*b* of the embodiment cover a machine part 112 inside the device main body 110 as shown in FIG. 5B to FIG. 5E and FIG. 6B to FIG. 6D. Before the aforementioned grayscale value difference determination step (steps S105 and S106 in FIG. 7) is performed, in the image capturing step (steps S103 and S104 in FIG. 7), a machine part grayscale value determination step may be performed, where the determining unit 130 determines whether the functions of the image capturing units 120*a* and 120*b* at the first time point and at the second time point are normal according to a machine part grayscale value of a portion of respective image corresponding to the machine part 112 (the region R4, the region R5, and the region R6 of partial image of the machine part 112 shown in FIG. 5D, FIG. 5E, and FIG. 6D. For example, in the region R4, the region R5, and the region R6, if the grayscale value is less than a machine part grayscale value determination threshold such as 0x0A, the image is determined to be normal, i.e., the function of the image capturing device 120*a* (or the image capturing unit 120*b*) is normal, otherwise, it represents that the function of the image capturing device 120*a* (or the image capturing unit 120*b*) is abnormal. According to another embodiment of the disclosure, the machine part 112 may be a casing, a base, a part, or a structure, or a structure provided in the device main body 110 that is specifically used for machine part grayscale value determination. According to another embodiment of the disclosure, the machine part grayscale value determination threshold may be 0x08, 0x18, 0x1A, etc., or other values, which may be adjusted according to actual conditions. If the machine part grayscale value determination step determines that the function of the image capturing unit 120*a* (or the image capturing unit 120*b*) at the first time point and at the second time point is abnormal, the machine part grayscale value determination step is performed again until the function of the image capturing unit 120*a* (or the image capturing unit 120*b*) is normal. If the machine part grayscale value determination step determines that the function of the image capture unit 120*a* (or the image capture unit 120*b*) at the first time point and at the second time point is normal, the subsequent grayscale value calculation and grayscale value difference determination step (steps S105 and S106 shown in FIG. 7) are performed. The machine part grayscale value determination step may further improve the effectiveness of the disclosure in reducing misjudgement of the subsequent detecting result caused by the abnormal function of the image capturing unit 120*a*, which is described as follows. According to an embodiment of the disclosure, the machine part grayscale value determination step is to find a region with a known grayscale value near the detecting region 110*a* inside the device main body 110, and the image captured during photographing includes the region with the known grayscale value, and a grayscale value of the region with the known grayscale value in the image is calculated and compared with the known value, where if the difference is not within a reasonable range, it represents that the function of the image capturing unit 120*a* is abnormal. According to an embodiment of the disclosure, the grayscale value of the region with the known grayscale value is very low (i.e., the region with the known grayscale value is very dark), and thus the grayscale value of the image thereof should be less than the machine part grayscale value determination threshold. However, if the grayscale value of the image is not less than the machine part grayscale value determination threshold, it means that the function of the image capturing unit 120*a* is abnormal, and if such situation is not ruled out, it may lead to misjudgement of the detecting result. Consequently, introduction of the machine part grayscale value determination step may rule out such situation.

In the detecting process shown in FIG. 7, if it is determined in step S106 that the function of the image capturing unit is abnormal, the flow directly returns to step S103 to perform the image capturing step and the grayscale value difference determination step again. In order to further save a detecting time, this part of the process may be simplified, which is described as follows.

Figure 9:
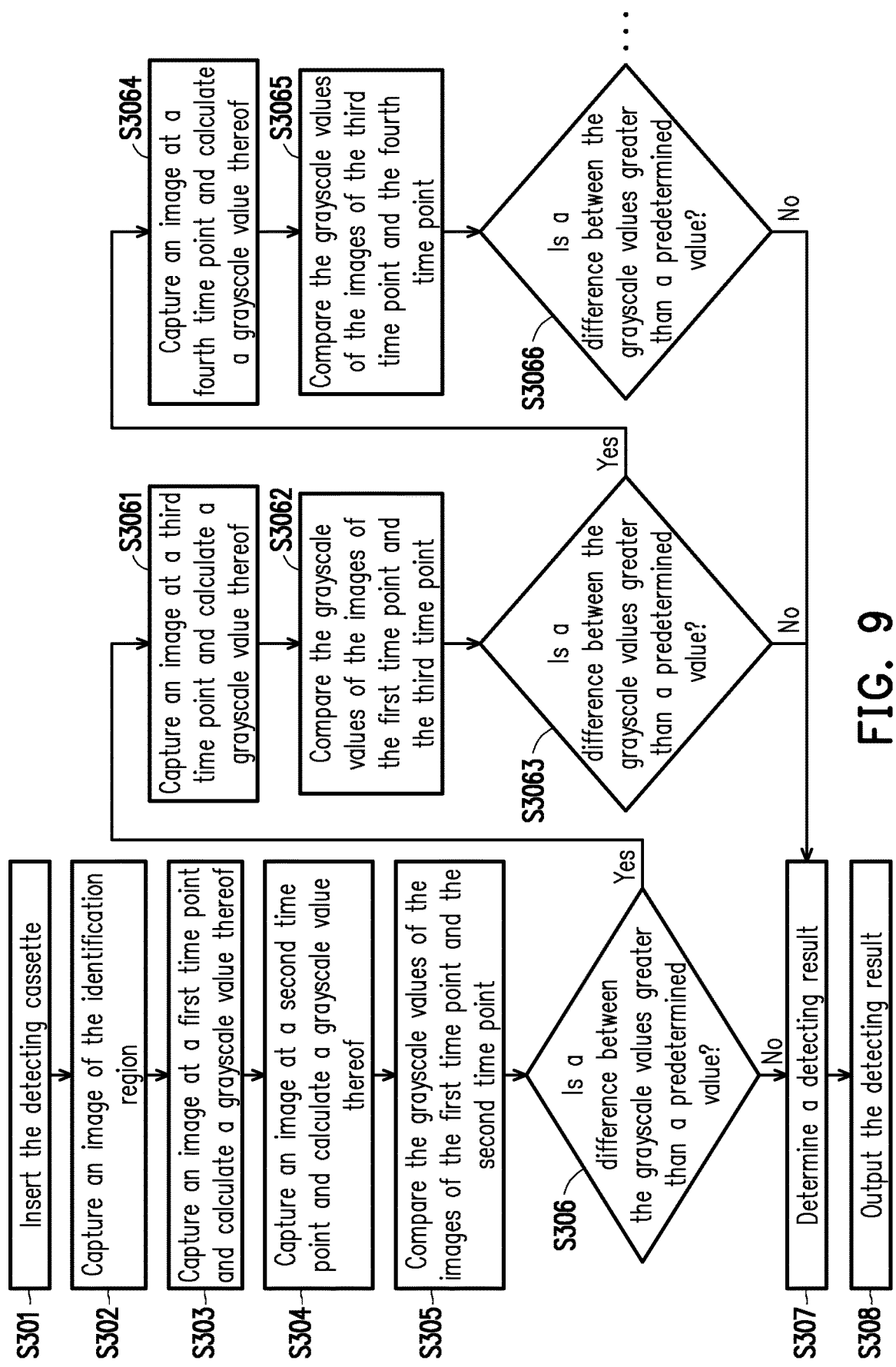
FIG. 9 illustrates a specific flow of a detecting method according to an embodiment of the disclosure.

FIG. 9 illustrates a specific flow of a detecting method according to an embodiment of the disclosure. In the detecting process shown in FIG. 9, most of the flow from step S301 to step S308 are similar to that of step S101 to step S108 in FIG. 7, which will not be repeated herein for the sake of brevity. A difference between the embodiment of FIG. 9 and the embodiment of FIG. 7 is that in the detecting process of FIG. 9, if it is determined in step S306 that the function of the image capturing unit 120*a* at the first time point and at the second time point is abnormal, the flow does not return to step S303, but a simplified image capturing step and a simplified determination step are performed. In the simplified image capturing step, the image capturing unit 120*a* captures another image of the detecting region at a third time point and calculates a grayscale value thereof (step S3601), and the simplified determination step determines whether the function of the image capturing unit 120*a* at the first time point and at the third time point is normal according to a difference between a grayscale value of a portion of the image of the first time point corresponding to the detecting cassette 50 and a grayscale value of a portion of the another image of the third time point corresponding to the detecting cassette 50 (steps S3062, S3063). If the difference is greater than a predetermined value, it is assumed that the function of the image capturing unit 120*a* at the first time point is abnormal and the function thereof at the third time point is normal. Under such a situation, the simplified image capturing step and the simplified determination step are performed again. In the simplified image capturing step, the image capturing unit 120*a* captures another image of the detecting region at a fourth time point and calculates a grayscale value thereof (step S3604), and the simplified determination step determines whether the function of the image capturing unit 120*a* at the third time point and at the fourth time point is normal according to a difference between a grayscale value of a portion of the image of the third time point corresponding to the detecting cassette 50 and a grayscale value of a portion of the another image of the fourth time point corresponding to the detecting cassette 50 (steps S3065, S3066). If the difference is greater than the predetermined value, it is assumed that the function of the image capturing unit 120*a* at the third time point is abnormal and the function thereof at the fourth time point is normal. Under such a situation, the simplified image capturing step and the simplified determination step are performed again to capture another image of the detecting region at a fifth time point and calculate a grayscale value thereof for comparing with the grayscale value of the image of the fourth time point, and the process is repeated like this until the difference is less than the predetermined value. If it is determined in step S3063 (or step S3066) that the difference is less than the predetermined value, it is deduced that the function of the image capturing unit 120*a* at the third time point (or at the fourth time point) is normal. Then, the determining unit 130 determines the detecting result according to a portion of the image at the third time point (or at the fourth time point) corresponding to the detecting cassette 50 (step S307) and outputs the detecting result (step S308). In FIG. 9, although steps S3062 and S3063 select the grayscale value at the first time point to compare with the grayscale value at the third time point, according to another embodiment of the disclosure, it is also feasible if steps S3062 and S3063 are changed to steps S3062' and S3063', and the grayscale value at the second time point is selected to compare with the grayscale value at the third time point in step S3062' and the difference thereof is determined whether it is larger than or less than the predetermined value in step S3063'.

Figure 10A:
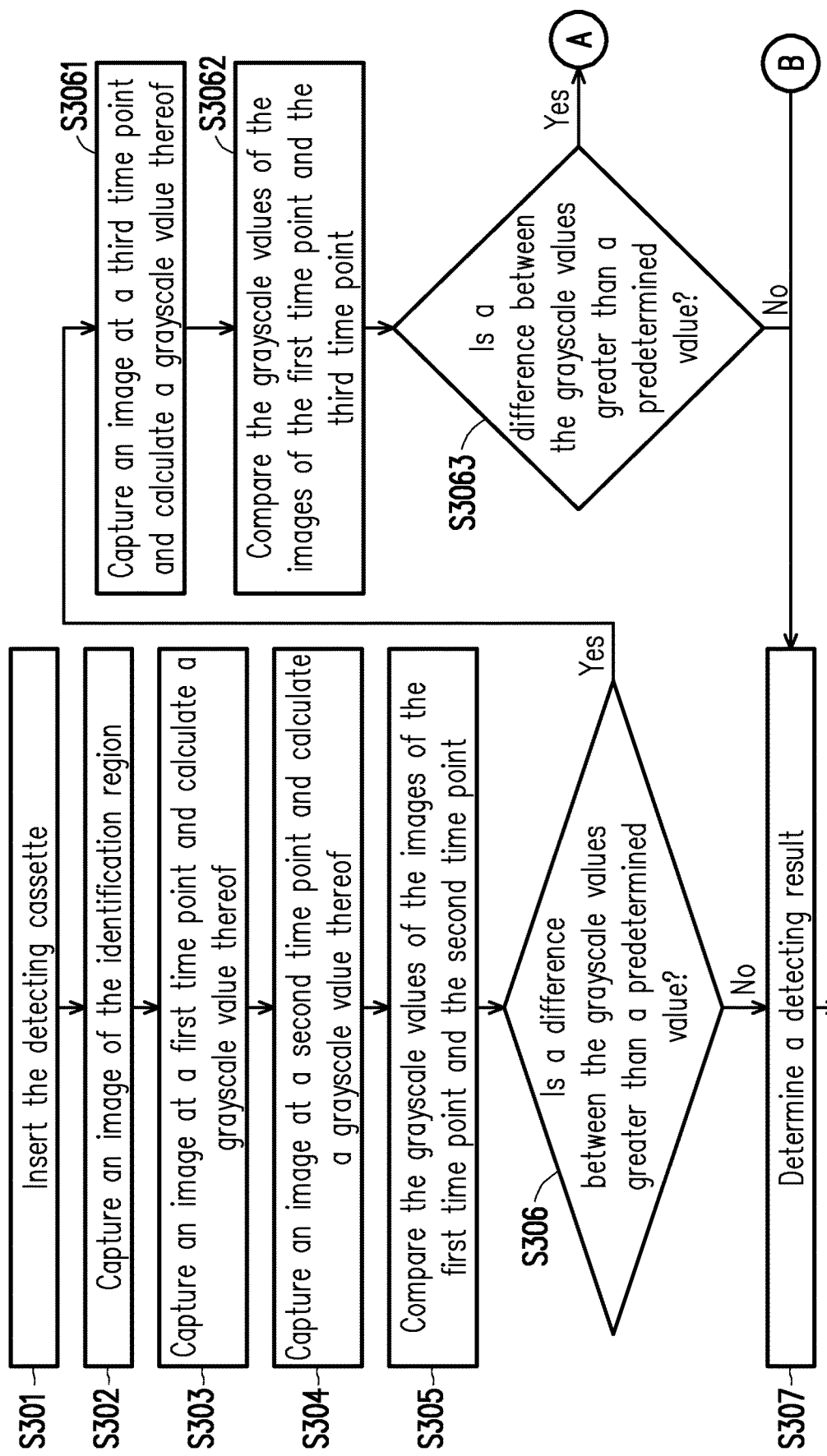
FIG. 10A and FIG. 10B illustrate a specific flow of a detecting method according to an embodiment of the disclosure.
Figure 10B:
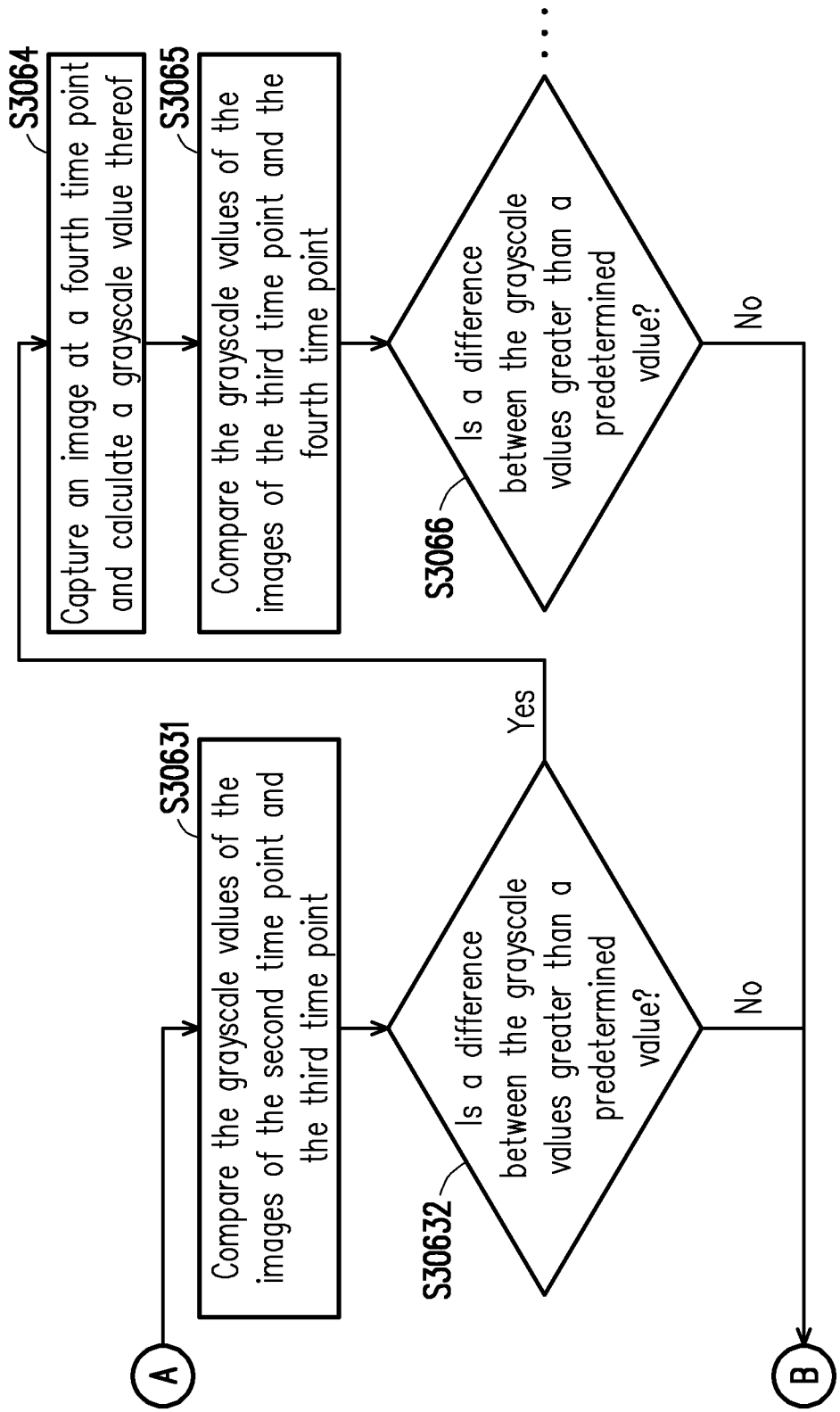

FIG. 10A and FIG. 10B illustrate a specific flow of a detecting method according to an embodiment of the disclosure. In the detecting process shown in FIG. 10A and FIG. 10B, most of the flow from step S301 to step S308 are similar to that of step S101 to step S108 in FIG. 7, which will not be repeated herein for the sake of brevity. A difference between the embodiment of FIG. 10A and FIG. 10B and the embodiment of FIG. 9 is that in the detecting process of FIG. 10A and FIG. 10B, if it is determined in step S3063 that the function of the image capturing unit 120*a* at the first time point and at the second time point is abnormal, further simplified determination steps S30631, S30632 are performed, wherein the image grayscale values at the second time point and at the third time point are directly compared in step S30631 without the need of further image photographing. If it is determined in step S30632 that the difference is less than the predetermined value, it is deduced that the function of the image capturing unit 120*a* at the third time point (or at the second time point) is normal. Under such a situation, the determining unit 130 determines the detecting result according to a portion of the image at the third time point (or at the second time point) corresponding to the detecting cassette 50 (step S307) and outputs the detecting result (step S308). If step S30632 determines that the function at the third time point and at the second time point is not normal, the image capturing unit 120*a* captures another image of the detecting region at a fourth time point and calculates a grayscale value thereof (step S3604), followed by steps S3065, S3066, and details thereof will not repeated herein for the sake of brevity.

What is claimed is:

1. A detecting method, adapted to detect a detecting cassette, the detecting method comprising steps of:
   placing the detecting cassette into a device main body to be located at a detecting region inside the device main body;
   capturing at least one image of the detecting region by at least one image capturing unit;
   determining whether a function of the at least one image capturing unit is normal by a determining unit according to a grayscale value of the at least one image; and
   determining a detecting result by the determining unit according to a portion of the at least one image corresponding to the detecting cassette in response to determining that the function of the at least one image capturing unit is normal,
   wherein the at least one image comprises at least two images, and the step of capturing at least one image of the detecting region by at least one image capturing unit comprises performing an image capturing step, and the step of determining whether the function of the at least one image capturing unit is normal by the determining unit comprises performing a grayscale value difference determination step, wherein
   the image capturing step uses the at least one image capturing unit to respectively capture the at least two images at a first time point and at a second time point, and
   the grayscale value difference determination step uses the determining unit to determine whether the function of the at least one image capturing unit at the first time point and at the second time point is normal according to a difference between a grayscale value of a portion of one of the at least two images corresponding to the detecting cassette and a grayscale value of a portion of another one of the at least two images corresponding to the detecting cassette.

2. The detecting method as claimed in claim 1, wherein the detecting cassette has an identification region and two reaction regions, and the step of capturing the at least one image of the detecting region by the at least one image capturing unit comprises steps of:
   capturing an image of the identification region and one of the two reaction regions by one of the at least one image capturing unit; and
   capturing an image of the other one of the two reaction regions by another one of the at least one image capturing unit.

3. The detecting method as claimed in claim 1, wherein the detecting cassette has an identification region and a reaction region, and the step of capturing the at least one image of the detecting region by the at least one image capturing unit comprises steps of:
   capturing an image of the identification region by one of the at least one image capturing unit; and
   capturing an image of the reaction region by another one of the at least one image capturing unit.

4. The detecting method as claimed in claim 1, further comprising a step of:
   performing a machine part grayscale value determination step, wherein the machine part grayscale value determination step uses the determining unit to determine whether the function of the at least one image capturing unit is normal according to a grayscale value of a portion of the respective at least one image corresponding to a machine part of the device main body.

5. The detecting method as claimed in claim 4, further comprising a step of:
determining the function of the at least one image capturing unit to be abnormal in response to determining that the grayscale value of the portion of the respective at least one image corresponding to the machine part is greater than a machine part grayscale value determination threshold.

6. The detecting method as claimed in claim 1, further comprising a step of:
performing a detecting cassette grayscale value determination step, wherein the detecting cassette grayscale value determination step uses the determining unit to determine whether the function of the at least one image capturing unit is normal according to a grayscale value of a portion of the at least one image corresponding to the detecting cassette.

7. The detecting method as claimed in claim 6, further comprising a step of:
determining the function of the at least one image capturing unit to be abnormal in response to determining that the grayscale value of the portion of the respective at least one image corresponding to the detecting cassette is less than a minimum threshold or greater than a maximum threshold.

8. The detecting method as claimed in claim 1, further comprising a step of:
performing again the image capturing step and the grayscale value difference determination step in response to determining that the function of the at least one image capturing unit at the first time point and at the second time point is abnormal.

9. The detecting method as claimed in claim 8, further comprising a step of:
determining the detecting result by the determining unit according to a portion of the at least one image of at least one of the first time point and at the second time point corresponding to the detecting cassette in response to determining that the function of the at least one image capturing unit at the first time point and at the second time point is normal.

10. The detecting method as claimed in claim 1, further comprising steps of:
obtaining a standard value according to grayscale values of portions of the respective at least two images corresponding to the detecting cassette in response to determining that the function of the at least one image capturing unit at the first time point and at the second time point is normal;
performing at least another image capturing step, wherein the at least another image capturing step uses the at least one image capturing unit to capture at least another image of the detecting region at at least a third time point; and
performing at least another grayscale value difference determination step, wherein the at least another grayscale value difference determination step uses the determining unit to determine whether the function of the at least one image capturing unit at the at least one third time point is normal according to a difference between a grayscale value of a portion of the at least another image corresponding to the detecting cassette and the standard value.

11. The detecting method as claimed in claim 10, further comprising steps of:
performing again the at least another image capturing step and the at least another grayscale value difference determination step in response to determining that the function of the at least one image capturing unit at the at least one third time point is abnormal; and
determining the detecting result by the determining unit according to a portion of at least one of the at least two images corresponding to the detecting cassette in response to determining that the function of the at least one image capturing unit at the at least one third time point is normal.

12. The detecting method as claimed in claim 1, further comprising steps of:
performing a simplified image capturing step and a simplified determination step in response to determining that the function of the at least one image capturing unit at the first time point and at the second time point is abnormal, wherein the simplified image capturing step uses the at least one image capturing unit to capture at least another image of the detecting region at a third time point, and the simplified determination step determines whether the function of the at least one image capturing unit at the third time point and a first selected one of the first time point and the second time point is normal according to a difference between a grayscale value of a portion of an image of the first selected one of the first time point and the second time point corresponding to the detecting cassette and a grayscale value of a portion of the at least one another image of the third time point corresponding to the detecting cassette.

13. The detecting method as claimed in claim 12, further comprising a step of:
determining the detecting result by the determining unit according to a portion of the at least one image of at least one of the first time point and at the second time point corresponding to the detecting cassette in response to determining that the function of the at least one image capturing unit at the first time point and at the second time point is normal.

14. The detecting method as claimed in claim 12, further comprising a step of:
performing a more simplified determination step to use a difference between a grayscale value of an image of a non-first selected one of the first time point and the second time point, and the grayscale value of a portion of the at least one another image of the third time point, to determine whether the function of the at least one image capturing unit at the third time point and the non-first selected one of the first time point and the second time point is normal in response to determining that the function of the at least one image capturing unit at the third time point and the first selected one of the first time point and the second time point is abnormal.

15. The detecting method as claimed in claim 12, further comprising steps of:
performing again the simplified image capturing step and the simplified determination step in response to determining that the function of the at least one image capturing unit at the third time point and the first selected one of the first time point and the second time point is abnormal; and
determining the detecting result by the determining unit according to a portion of the at least one image of the first selected one of the first time point and the second time point and the at least another image of the third time point corresponding to the detecting cassette in response to determining that the function of the at least one image capturing unit at the third time point and the first selected one of the first time point and the second time point is normal.

16. The detecting method as claimed in claim 1, wherein the detecting cassette has an identification region, and the step of determining whether the function of the at least one image capturing unit is normal comprises determining whether the function of the at least one image capturing unit is normal according to a grayscale value of a portion of the at least one image corresponding to at least a portion of the identification region.

17. The detecting method as claimed in claim 1, wherein the detecting cassette has at least one reaction region and at least one reference symbol adjacent to the at least one reaction region, and the step of determining whether the function of the at least one image capturing unit is normal comprises determining whether the function of the at least one image capturing unit is normal according to a grayscale of a portion of the at least one image corresponding to the at least one reference symbol.

18. The detecting method as claimed in claim 1, further comprising steps of:
performing a machine part grayscale value determination step, wherein the machine part grayscale value determination step uses the determining unit to determine whether the function of the at least one image capturing unit is normal according to a grayscale value of a portion of the respective at least one image corresponding to a machine part of the device main body; and
performing a detecting cassette grayscale value determination step, wherein the detecting cassette grayscale value determination step uses the determining unit to determine whether the function of the at least one image capturing unit is normal according to a grayscale value of a portion of the at least one image corresponding to the detecting cassette.

* * * * *